Dec. 25, 1945.   J. J. MACEK   2,391,430
CAMERA AND PROJECTOR
Filed Dec. 2, 1942   2 Sheets-Sheet 1

INVENTOR.
Joseph J. Macek
BY
H. C. Liesem
ATTORNEY

Dec. 25, 1945.   J. J. MACEK   2,391,430
CAMERA AND PROJECTOR
Filed Dec. 2, 1942   2 Sheets-Sheet 2
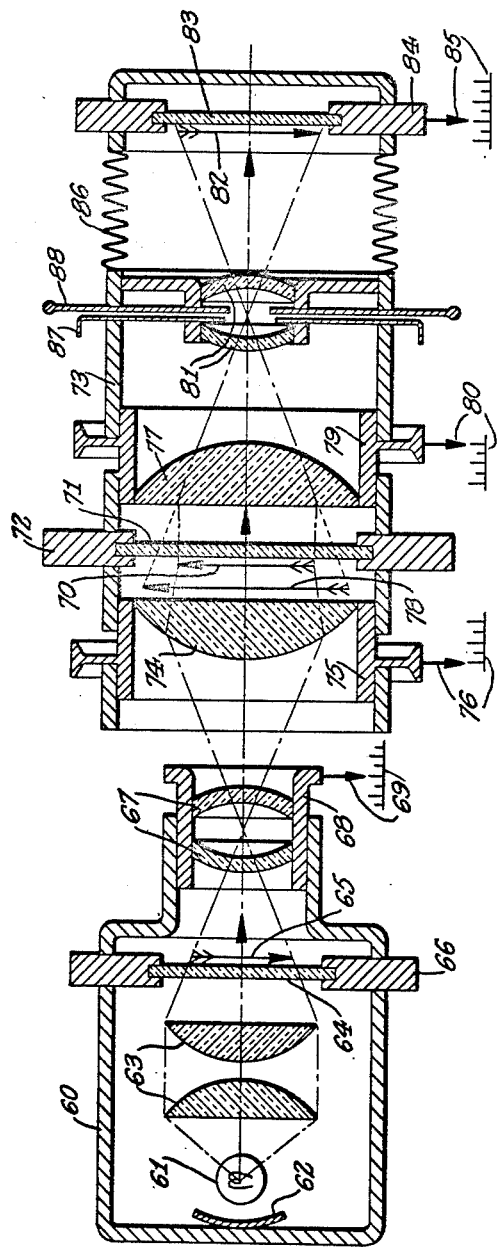
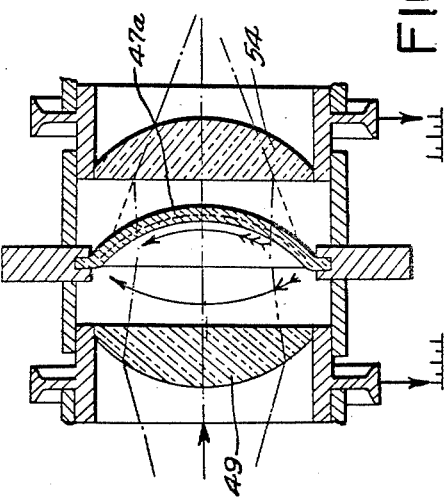
INVENTOR.
Joseph J. Macek
BY
H. C. Lliseus
ATTORNEY Patented Dec. 25, 1945

2,391,430

UNITED STATES PATENT OFFICE 2,391,430

CAMERA AND PROJECTOR

Joseph J. Macek, Montclair, N. J.

Application December 2, 1942, Serial No. 467,566

7 Claims. (Cl. 88—24)

This invention relates to cameras and projectors and to combinations thereof and more particularly to the optical systems of such apparatus.

A primary object of the invention has been to provide a simple arrangement of lenses and other devices by which images may be produced or reproduced with greater clarity and sharpness of definition and with more uniform distribution of light, either in true conformity with the object or with certain controlled and pre-determined distortion effects. Toward this end a special unit has been provided, formed of a plurality of light converging elements with a member between them capable of holding a real image. This unit is adapted for use in combination with other optical means provided in cameras, projectors, and the like.

Another object of the invention has been to provide a projector capable of producing an image with a three-dimensional effect and a camera designed particularly to produce pictures for this purpose.

A further object has been to provide a combination projector and camera capable of forming a reproduction of an original picture with the full clarity and sharpness of definition to be found in the original, either as an accurate copy of the original or with certain controlled distortion effects. In accordance with this phase of the invention, a reproduction better suited for three-dimensional projection may be formed. The reproduction may be on an enlarged or a reduced scale or it may be of the same size as the original, as desired.

Other objects, features and advantages of the invention will appear from a detailed description of certain illustrative forms of the same which will now be given in conjunction with the accompanying drawings, in which:

Fig. 3 is a similar view showing a combined projector and camera embodying the invention, and Fig. 4 is a similar view showing the lens unit of the present invention with a modified form of screen between the lenses.

Figure 1:
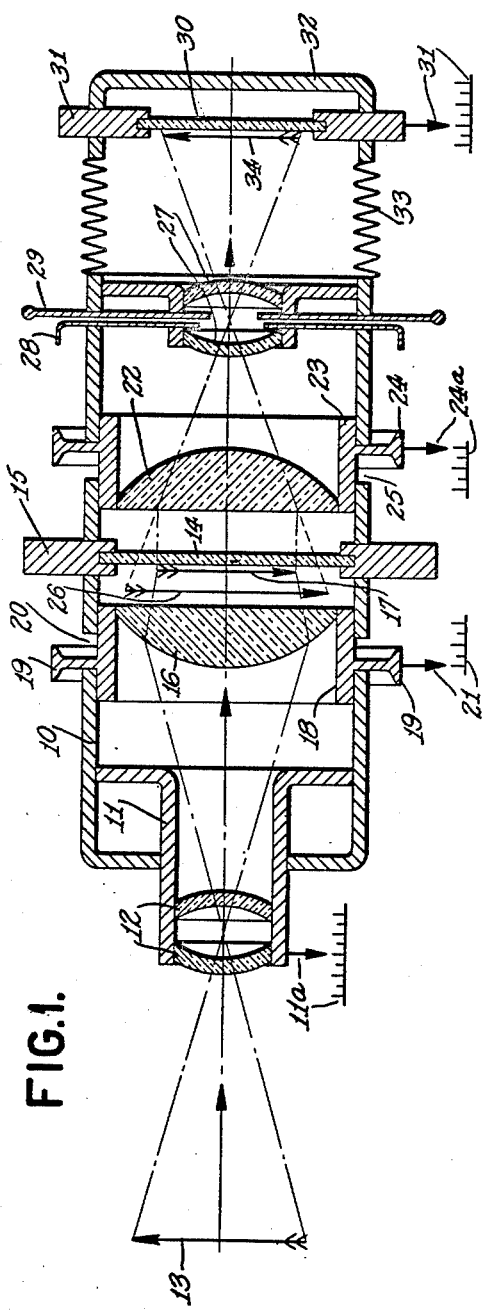
Fig. 1 is a schematic view, in section, along the axis of a camera embodying the invention.

Referring now to Fig. 1, it will be understood that the illustration of the improved camera is simply schematic and that in actual construction its form may be varied widely to suit particular requirements. The camera may include a casing or housing 10 of cylindrical or other suitable form having at its forward end an aperture adapted to slidably or adjustably receive a lens holder 11. Any desired means may be employed to provide a light-tight fit or joint between the housing 10 and holder 11 and between any other similar relatively moving parts of the camera. The lens holder may carry any appropriate type of lens 12, or combination of lenses, adapted to focus an image of the desired object 13 upon a screen or other image-receiving member 14 mounted in a carrier 15 which is preferably slidably and removably received by the casing 10. It will be understood that the retainer 11 is adapted to be shifted back and forth in the end of the casing in order to bring the image upon the screen 14 into proper focus. Any suitable form of index and scale 11a may be provided for indicating the position of adjustment of the retainer. The scale may appropriately be graduated in terms of the distance between the object and the lens.

Screen 14 is preferably in the form of a ground-glass plate which serves to diffuse the light and provides light-receiving surfaces in different planes at and between the surfaces thereof, all within the focal depth of the lens 12. However, in lieu of a ground-glass plate, any suitable type of translucent image-receiving member, in the form of a screen, plate or film having the properties of a ground-glass plate, may be employed. This member, moreover, may be variously grained or shaped to suit particular requirements. It may, for example, be concavo-convex when sharp focusing is desired in conjunction with curvature of field. For certain purposes the member 14 or the carrier 15 may be provided with a permanent picture or design of any desired character, or with appropriate written matter, or with an interchangeable transparency to be combined with the image of the selected object. It will be understood that the image formed upon the member 14 is a real image as distinguished from a virtual image. If desired, the carrier 15 may be adapted to receive different types of screens, plates or films, interchangeably. The carrier could, however, be permanently fixed in the housing if such interchangeability is not desired.

Between the lens 12 and the member 14 is interposed a relatively large lens 16, preferably plano-convex and of short focal length. This lens is positioned relatively close to the member 14 and serves to condense or converge the beams of light received by it from the lens 12. Thus, the image 17 formed upon the member 14 is reduced somewhat from the size it would normally have in the absence of lens 16 and it is correspondingly brighter. Moreover, a more uniform distribution of the light is produced. Provision is preferably made for the adjustment of lens 16 relative to member 14, this adjustment being dependent upon or correlated with that of the lens 12. For this purpose lens 16 is mounted in a frame 18 having a relatively close sliding fit within the casing 10 and having projections 19 at spaced points adapted to extend through suitable elongated slots 20 in the casing. These projections provide appropriate means for the normal adjustment of the lens in an axial direction, in the manner indicated. If desired, screw-threaded or cam means may be employed for shifting the lens in response to rotation thereof or of a separate adjusting element. An indicator and scale 21 may be provided to show the particular adjustment of the lens.

At the opposite side of the member 14 a second lens 22 is provided, this being preferably of the same form as the lens 16 but mounted in reverse relation. It may suitably be carried by an adjustable frame 23 slidable axially or longitudinally within the casing 10, in the same manner as the frame 18. The two frames 18 and 23 may be connected for synchronous movement in the same or opposite directions, if desired, but preferably they are independently adjustable. Radial projections 24, integral with the frame 23, may extend through elongated slots 25 in the casing to permit the desired adjustment. An index and scale 24a may be provided to indicate the position of adjustment of the lens 22 at all times. This lens serves as a magnifying element and produces a virtual image 26 of the real image 17 on the member 14. The improved image is transmitted to a lens system 27 which is preferably a fast lens of a corrected type commonly employed in cameras. Between the sections of this lens may be provided the usual diaphragm 28, for regulating the size of the opening and hence the amount of light to be admitted into the camera, and a shutter 29 of any suitable construction, for controlling the exposure of the photographic film or plate. A photographic plate 30 has been illustrated as adapted to receive the image projected by the lenses 22 and 27 from the real image formed on the screen 14. The plate 30 may be carried by a suitable retainer 31, which is removable from the camera in a well known manner. This retainer may be slidably received by a frame or housing 32 which is adjustable in relation to the casing 10 and which may be connected with the latter in any suitable way, as by means of a bellows construction 33 capable of extension and contraction while excluding the access of light. Frame 32, it will be understood, is adjusted with relation to the lens 27 to bring about the proper focusing of the image 34 on the plate 30, this depending in turn upon the adjustment of the lens 22. An index and scale 31a may be employed to indicate the position of the plate 30 in relation to the lens 27. If desired, a ground-glass plate may be used interchangeably with the photographic plate 30 and means may be provided for viewing the image on the ground-glass for purposes of sharp focusing.

A primary feature of the foregoing construction is the inter-position between the original lens 12 and the photographic plate 30 of the unit composed of lenses 16 and 22 and the image receiving member 14. It will be seen that through the inclusion of this unit, a real image of the object to be photographed is first formed on the screen or other image receiving member 14 and this is then transmitted to the photographic film or plate for reproduction. When the lenses 16 and 22 are positioned at equal distances on opposite sides of the screen 14, any tendency of the lens 16 to distort the image is offset by the lens 22 and a sharp, clear-cut picture with exceptional detail is produced on the plate 30. On the other hand, if a certain distortion is desired, it may be produced by proper adjustment of the lenses 16 and 22. Positioning of the lens 22 a greater distance than lens 16 from the screen 14 will produce the effect of lines diverging from the horizontal and vertical center lines of the image, whereas the reverse relation will produce the effect of converging lines in the image bending toward the horizontal and vertical center lines of the latter. Controlled distortion of the image may thus be obtained by simple adjustment of the lenses.

While certain distinct advantages flow from the employment of the complete combination set forth in the foregoing, a substantial benefit may be derived from a relatively simple construction embodying only a portion of the complete combination. In the simplified structure the carrier 15 may be adapted to receive, interchangeably, a ground-glass plate or similar image-receiving and displaying element, such as the plate 14, at one time and a photographic element, such as the plate 30 at another time. The housing could in that case be terminated just beyond the carrier 15, provision being made for the removal of all or a portion of the end wall for the purpose of viewing the image when the plate 14 is in the carrier. At the same time, the lens 12 in the modified camera should be replaced by the lens structure 27 or it should otherwise be supplied with a diaphragm and shutter, similar to the means 28 and 29 disclosed in connection with the lens 27. In the use of this simplified construction, the ground-glass plate may first be inserted in the carrier 15, for focusing purposes, and the lens 12 and 16 suitably adjusted to provide a sharp, bright image upon the screen. The latter may then be removed and replaced by a photosensitive plate or film on which the desired image may be reproduced. Other focusing means may, if preferred, be employed and in that case the carrier 15 may be adapted to retain only the photo-sensitive, image-receiving plate or film. The provision of the light-converging lens 16, either in fixed relation to the carrier 15 or in axially adjustable relation thereto, the lens being always positioned at a distance from the screen or photographic plate less than the focal length of the lens 16, will result in the production of more sharply defined and brighter images than if the lens 16 were omitted. Faster and better pictures may thus be taken under specific conditions.

Figure 2:
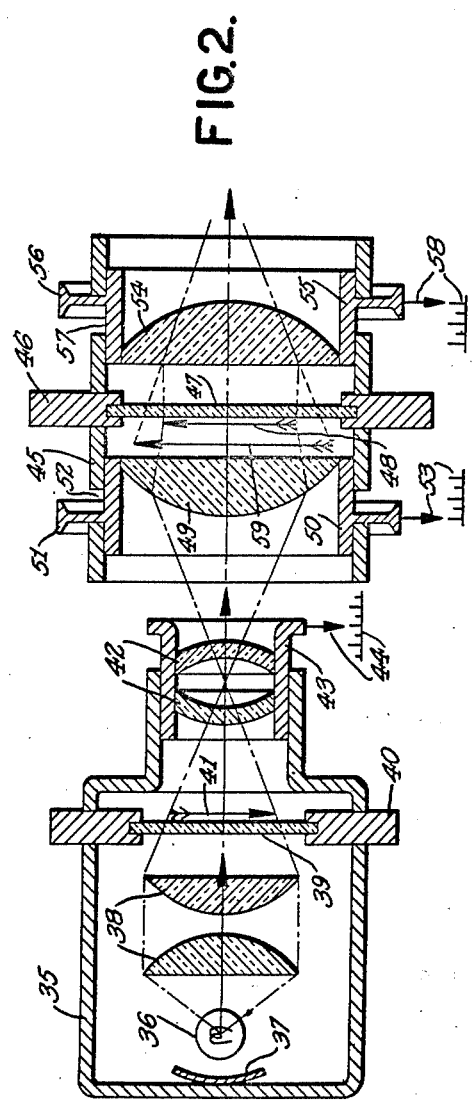
Fig. 2 is a similar view disclosing a projector embodying the invention.

In Fig. 2 the employment of the new lens unit in connection with a pojector is illustrated. This projector is of the desk type in which an image of the picture to be reproduced is formed upon a screen embodied in the projector itself rather than upon a curtain or screen some distance away. The projector may comprise a housing 35 formed of metal or a plastic of suitable character and having any desired configuration. Within the housing there is mounted an electric lamp 36 or other light emitting means. For certain purposes, if desired, this light source may be adapted to emit rays outside of the visual range. It may, for example, be a source of ultraviolet rays or of infrared rays, either alone or in combination with light rays. A reflector 37 is preferably employed in back of the light source to direct a concentrated beam of the rays toward and through a condensing lens 38 of appropriate character. The condensed and converging light rays are then directed through a transparency 39 which carries the picture or object whose image it is desired to project or reproduce. The transparency may be either in the form of a glass slide or a film or plate formed of any suitable, transparent material capable of withstanding the heat generated by the light source 36. A retainer 40 of any appropriate construction may be provided for supporting the transparency. This retainer may suitably be in the form of a slide adapted to be freely inserted in and removed from the housing 35 so as to permit a quick change of the transparency to be projected. As will be understood, any conventional construction may be employed to enable the projection of a series of transparencies without interruption. For example, a single retainer may be adapted to receive two transparencies in side by side relation, the one being disposed in projecting position while the other is outside of the housing 35 where it may be readily changed.

On one face of the transparency 39 there is formed the picture or other object 41 whose image is to be projected. Reproduction of the image is effected by means of a lens 42 of appropriate form mounted in a holder 43 and adapted to be shifted axially, for focussing purposes, within an extension of the housing 35. An indicator and scale 44 may be provided, if desired, to assist in bringing about the proper adjustment of the lens 42 in relation to the object 41 and the screen, to be hereinafter described, which is to receive the projected image.

Axially in line with the housing 35 and with the beam of light projected from within the housing by the lens 42 is a casing 45, preferably of cylindrical form, having mounted therein at substantially its midpoint a carrier 46 adapted to retain a translucent image-receiving member 47. This member, in the preferred construction, is a ground-glass plate of suitable thickness and shape which presents image-receiving surfaces in different planes at slightly different distances from the lens 42 and within the focal depth of projection of this lens. It may, for example, be concavo-convex as shown at 47a in Figure 4, when sharp focusing is desired in conjunction with curvature of field. In lieu of a ground-glass plate, however, a screen or film or plate formed of other translucent material, capable of receiving and displaying a real image 48, may be employed. If desired, the carrier 46 may be slidably mounted in the casing so as to be readily removable therefrom and permit interchange of various different image-receiving members. Between the image-receiving member 47 and the lens 42 there is disposed a relatively large, light-converging lens 49 mounted in a carrier 50 within the casing 45. The carrier 50 is preferably adjustable axially toward and from the member 47 and, for this purpose, may be provided with a plurality of spaced projections 51 extending through the wall of the casing 45. Projections 51 may suitably extend through elongated slots 52 which will permit the specified axial adjustment of the holder 50 with its lens 49. Any suitable means may be provided for bringing about the desired adjustment of the retainer 50 and an index and scale 53 may be employed to disclose the adjusted position of the retainer, this being dependent at least in part, upon the adjustment of lens 42. Due to the provision of the lens 49, the image 48 formed upon the member 47 will be of somewhat reduced size and will be brighter, with the light more uniformly distributed thereover, than if the lens 42 were permitted to project the image directly upon the member 47.

In front of the image-receiving member 47 there is mounted another light-converging lens 54 carried by a retainer 55 having spaced projections 56 extending through elongated slots 57 in the casing 45 to permit adjustment of the retainer in an axial direction, in the same manner as the retainer 50. An index and scale 58 may be provided to indicate the adjustment of the lens 54. Through the use of this lens, the image produced on the member 47 may be viewed with greater clarity and sharpness, and on a slightly magnified scale, from a point in front of the projector substantially along the line of its axis. Several persons stationed in front of the projector, and substantially along the line of projection, may view the magnified virtual image 59. This virtual image will be found to create a quite distinct three-dimensional effect. While the reason for this effect is not fully understood, it is apparently due, at least in part, to the depth of focus permitted by the ground-glass screen or the like upon which the real image 48 is formed. It has been found, moreover, that by proper adjustment and relationship of the lenses 49 and 54, substantially all distortion of the image as viewed may be eliminated. On the other hand, if desired, the adjustment and co-relation of the lenses 49 and 54 may be such that an image embodying certain predetermined distortion effects may be produced.

Turning now to Fig. 3, there is disclosed, schematically, a combination unit embodying a projector and a camera by which photographic reproductions of pictures or other objects formed or mounted on transparencies may be made. The apparatus for this purpose may be substantially a combination of the devices shown in Figs. 1 and 2 with the omission of one of the lenses, i. e., 12 or 42. Thus, there may be provided a housing 60 having a light source 61 and reflector 62 therein arranged to project a beam of light through a lens system 63 and then through a transparency 64 carrying the picture or other object 65 to be photographically reproduced. The transparency may be suitably held by a slide or carrier 66 arranged to facilitate the introduction of any desired picture or object. The object 65 is projected by a lens 67 carried by an adjustable retainer 68 whose position may be indicated by an index and scale 69. A real image 70 may thus be formed upon an appropriate image-receiving member 71 carried by a slide 72 mounted in a casing 73. The projecting beam forming the image 70, however, is first passed through a lens 74 mounted in an axially adjustable retainer 75 whose position is dependent on the adjustment of lens 67 and may be indicated by an appropriate index and scale 76.

The image 70 on the member 71 is sharpened and magnified by a lens 77 to form a virtual image 78. Lens 77 is preferably mounted in an axially adjustable retainer 79 whose position may be indicated by an index and scale 80. The magnified and otherwise improved image is picked up by a lens 81 of any suitable form, such as conventionally employed in cameras. This lens focuses a desired sharp image 82 of the improved image 78 upon a photographic plate or film 83. The latter may be held in proper position by any suitable form of retainer 84, the position of adjustment of which may be indicated by an index and scale 85. If desired, a ground-glass plate may be used interchangeably with the photographic plate 83 and means may be provided for viewing the image on the screen for purposes of sharp focusing. It will be understood that, as is common in camera construction, provision may be made for relative axial adjustment between the lens 81 and the photographic element 83. A bellows construction 86, or the like, may be employed to permit this adjustment while excluding all light other than that obtained from the screen 71. An appropriate diaphragm 87 may be provided in association with the lens 81 to vary the size of the aperture through which the image is passed to the element 83. A shutter 88, of appropriate construction to provide the desired speed of action, is also employed in association with the lens 81. In the use of the combined projector and camera, highly desirable reproductions may be formed of any pictures or objects mounted in the carrier 66. If desired, a transparency or other object may be employed in the carrier 72 for inclusion in the reproduction. Proper adjustment of the lenses 74 and 77 in relation to the member 71 will result in the formation of clear, sharply defined photographs, substantially free from distortion, with proper perspective, and with more uniform distribution of light over the entire area. The photographs so produced, moreover, are exceptionally well suited for three-dimensional projection by means of the apparatus disclosed in Fig. 2. If desired, the form and adjustment of the lenses 74 and 77 may be such as to provide a predetermined distortion effect in the photographic image on the element 83.

While several illustrative embodiments of the invention have been disclosed in considerable detail, it will be understood that numerous changes may be made in the construction and arrangement of the several parts without departing from the general principles and scope of the invention. For example, while the invention has been disclosed in relation to apparatus for taking and projecting still pictures it may be employed to equal advantage in connection with apparatus for taking or projecting motion pictures. Suitable devices may be incorporated in a camera or projector or a combination of both for advancing a film or films step by step in properly synchronized relation to the other mechanisms. The terms and expressions used herein have been employed as terms of description and not of limitation.

What I claim is:

1. Apparatus of the class described comprising a housing, a translucent image receiving member within said housing, means including a lens for forming a desired image on said member, a second lens interposed between said first-mentioned lens and said member, a lens on the opposite side of said member arranged to magnify the image formed thereon, and means connected with said housing for retaining said second lens and said lens on the opposite side of said member in such manner as to enable adjustment thereof toward and from said member while maintaining the same at all times spaced less than their focal lengths from said member.

2. In apparatus of the class described means for controlling the distribution of illumination and the distortion of a transmitted image which comprises a translucent member for receiving a real image to be transmitted, a light-refracting element on each side of said member, and means for retaining said member and said elements in such manner as to enable adjustment of said elements toward and from said member for the purpose specified.

3. In apparatus of the class described means for controlling the distribution of illumination and the distortion of a transmitted image which comprises a housing, a slidable carrier in said housing, a translucent member mounted in said carrier for receiving a real image to be transmitted, and a light refracting element mounted in said housing on each side of said member, said elements being so mounted as to be adjustable toward and from said member for the purpose specified.

4. In apparatus of the class described means for controlling the distribution of illumination and the distortion of a transmitted image which comprises a translucent member for receiving a real image to be transmitted, a light converging lens on each side of said member, and means for so retaining said member and said lenses that said lenses are spaced less than their focal lengths from said member and are adjustable toward and from said member to control the effect thereof.

5. In a camera a housing, a translucent, light diffusing, image receiving member within said housing, means including a lens for forming a desired image on said member, a second lens between said first-mentioned lens and said member for converging onto said member the light forming the image, another lens on the opposite side of said member for magnifying the image formed thereon, means in said housing for retaining said second lens and said lens on the opposite side of said member in such manner as to enable adjustment of said lenses axially relative to said member, and means for focussing the resultant image on a light sensitive element.

6. In a camera a housing, a translucent image receiving member within said housing, means including a lens for forming a desired image on said member, a second lens between said first-mentioned lens and said member for converging onto said member the light forming the image, another lens on the opposite side of said member for forming a magnified virtual image of the real image formed on said member, means for supporting a light sensitive element, a lens for transmitting the resultant virtual image to said light sensitive element, and means for so retaining said last-mentioned lens and said element as to be adjustable relative to each other.

7. In apparatus of the class described a pair of light converging lenses, means interposed between said lenses for receiving a transparency, and means for retaining said lenses and said means interposed therebetween in a manner to render said lenses adjustable toward and from said means but maintaining the same at all times spaced less than their focal lengths from said means.

JOSEPH J. MACEK.